United States Patent Office 3,035,964
Patented May 22, 1962

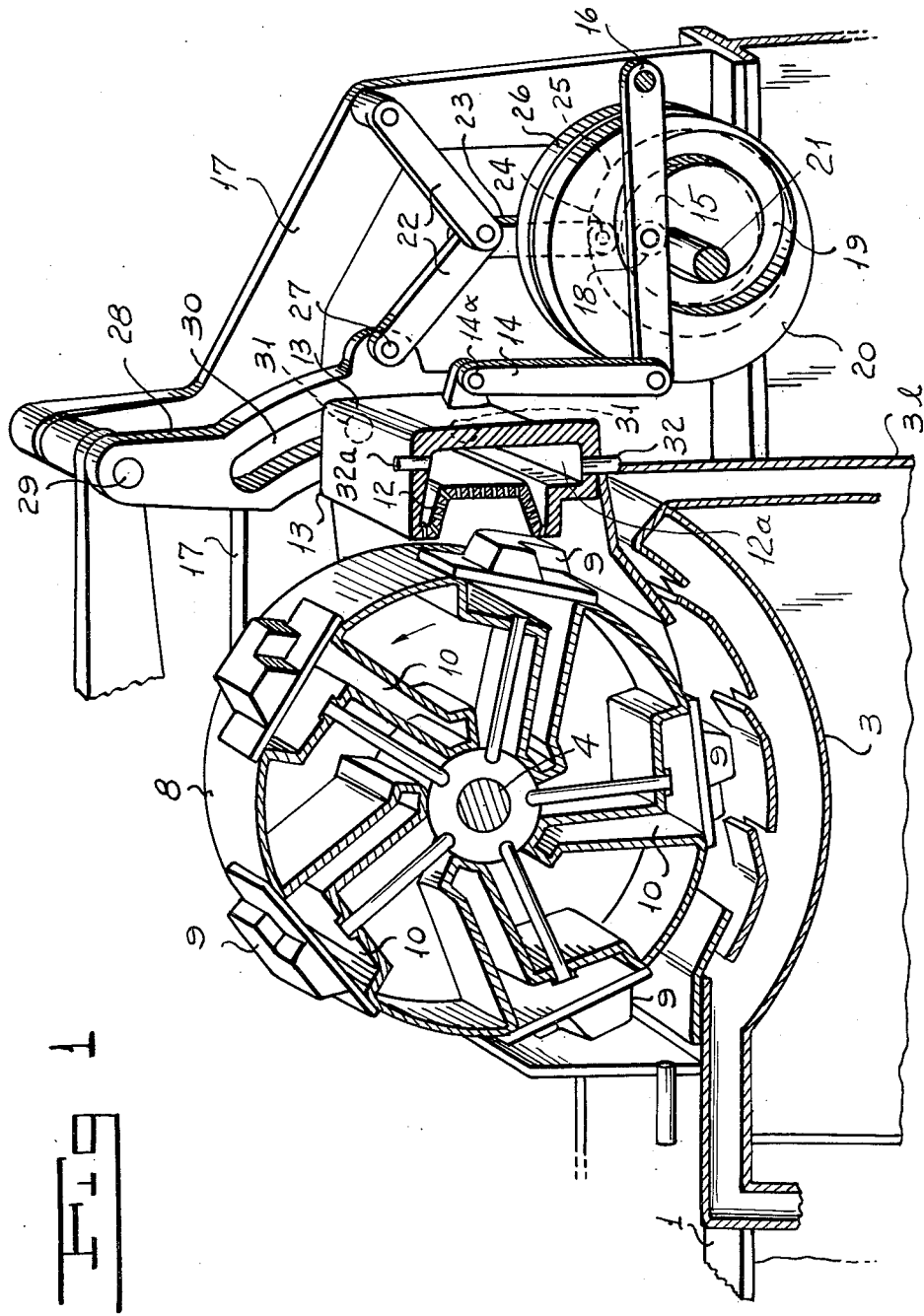

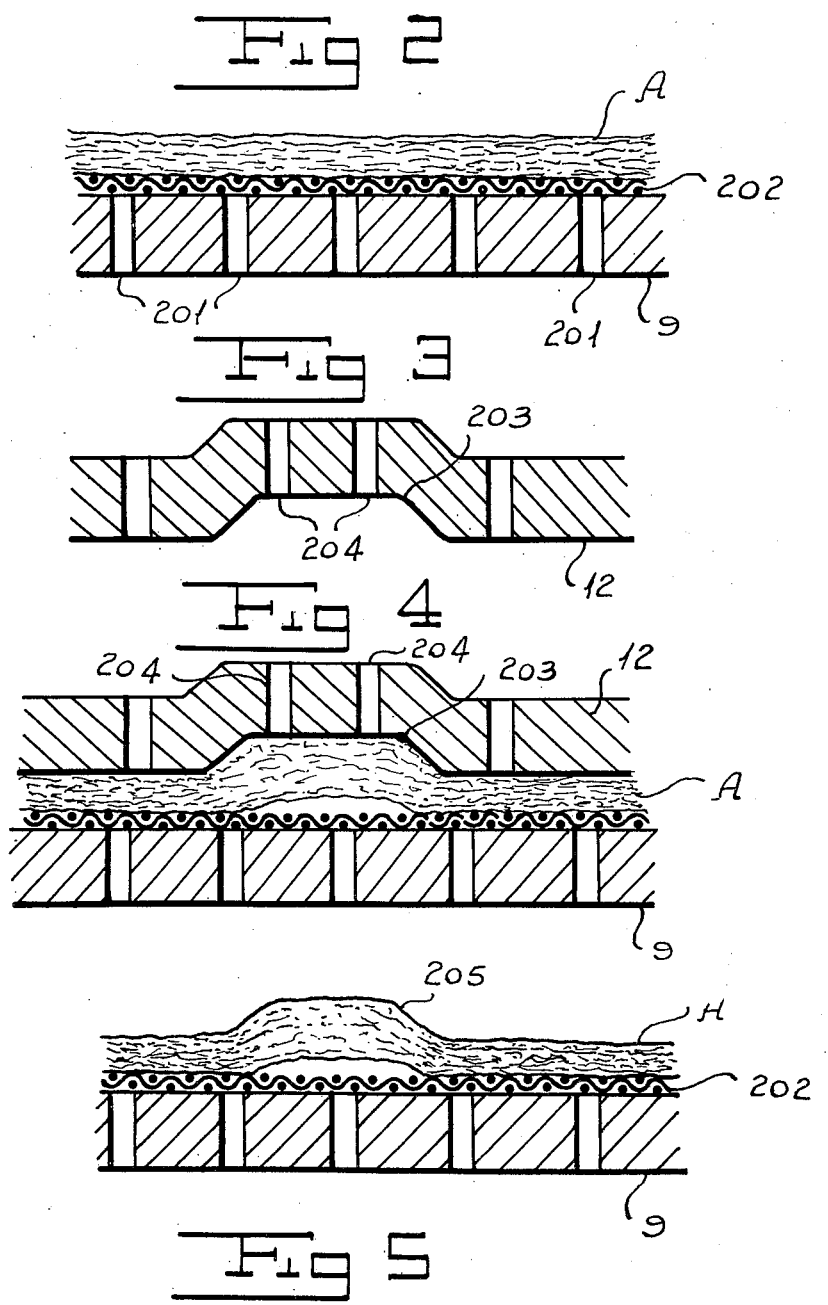

3,035,964
METHOD OF MAKING MOLDED PULP ARTICLES WITH RELATIVELY HARD AND SOFT PORTIONS AND RESULTING ARTICLE
Merle P. Chaplin, South Portland, Maine, assignor, by mesne assignments, to Diamond National Corporation, New York, N.Y., a corporation of Delaware
Original application Sept. 29, 1953, Ser. No. 382,985, now Patent No. 2,938,582, dated May 31, 1960. Divided and this application May 22, 1959, Ser. No. 817,704
8 Claims. (Cl. 162—115)

This application is a division of my copending application, Serial No. 382,985, filed September 29, 1953, now Patent No. 2,938,582, on "Method of and Apparatus for Making Molded Pulp Articles." The said parent application discloses integrated apparatus and methods for forming pulp articles and comprises all apparatus and method steps from initially suction forming an article on a suction die to and including the discharge of such article from the apparatus, in a condition to be packed and ready for the market. That apparatus and method embodies, inter alia, means operable upon a freshly suction formed article, for solidifying said article either in whole or in part while said article remains upon the corresponding suction forming die.

The present invention is directed to a method disclosed in the parent application and to articles resulting from the practicing of said method. Articles produced thereby are adapted for various purposes and uses. Some of these articles comprise plates, dishes and trays for the packaging and delivery of foods and food products. Others include packing flats and cartons for eggs and fruits which may be kept in storage for different time periods. They are particularly adapted for use as containers and packages of various kinds for so-called durable goods, such as hardware, light bulbs, automobile and aeroplane parts and assemblies, and products of a similar nature where a strong but yielding type of packing material is necessary to insure safe delivery of articles and materials of these kinds.

The object of the invention is to provide a novel method of making articles with strong relatively rigid portions and relatively yielding or cushioning sections or areas where these are desirable or necessary for the proper and effective protection of packaged materials.

Features of this invention, other than those specified, will be apparent from the following detailed description and from the accompanying drawings.

The accompanying drawings show one embodiment of the invention, but the structure therein shown is to be understood as illustrative, only, and not as defining the limits of the invention.

FIG. 1 is a fragmental perspective view, showing mechanism for operating certain solidification mechanism relative to forming dies as the latter continue to rotate. This view corresponds to FIG. 10 of the parent application.

FIGS. 2–5 are fragmental sections, showing the manner in which one or more portions of a molded pulp article may be provided with relatively softened or cushioning areas or portions through cooperation of the forming and solidification dies shown in the other figures of the drawings.

The first step in producing an article according to this invention is the formation of a shaped layer or sheet of pulp or fibre material on a foraminous forming die by means of suction back of the die.

The mechanism which forms the articles from a liquid pulp or fibre mixture is illustrated generally in FIG. 1. Mounted on a suitable base for rotation on a generally horizontal axis above the fibre mixture in tank 3, is a shaft 4, driven from any suitable prime mover. Mounted on the shaft 4 is a forming drum 8 about the periphery of which are mounted forming dies 9, these being arranged in any suitable manner for the formation of articles of various kinds and types. Any suitable number or sets of these dies may be employed, but, for the purposes of illustration, I here show five dies arranged about the drum periphery, each set being circumferentially spaced equidistantly from the other. Rotation of the drum carrying these dies causes them to pass through the fibre mixture, supplied to and circulated through the tank 3, and a fibrous layer is suction accreted on each forming die so submerged, to form an article thereon in a manner which may be conventional to this art.

The pulp or fibre material, in very dilute form, mixed with water or other liquid, is prepared by various methods and means well known in the art. This dilute mixture, in proper relation of fibres and liquid, is introduced into tank 3. The level of liquid-fibre mixture in this tank is maintained reasonably constant.

The formation of articles on the surface of the dies 9 is performed by the application of suction to the interior of each die, and for such purpose, the interior of the drum is provided with a drainage duct 10 associated with each die, these suction connections 10 leading to suitable vacuum pumps or other supply mechanism at proper times to accrete the layer of fibre on the die 9 by suction forming methods well known in the art. Similarly, compressed air is communicated to these suction passages 10 at the rear of the die 9, to facilitate the removal of the articles formed thereon by methods and means also well known in the art.

The communication of suction for the removal of the water drawn through the die perforations while the article is being formed, as well as pressure applied through the rear of the die for the removal of the article therefrom, is so well known in the art that a detailed description is not considered necessary.

After an article has been suction formed on a die 9, as stated, continued rotation of the drum carries the article out of and beyond the tank 3. Since suction is continued through the die, an even solidification is obtained over the entire article surface due to atmospheric air pressure against the exposed surface thereof. With some pulps this is sufficient to permit subsequent removal of the article from this die without damage to said article. With other materials, however, it is desirable to solidify the article mat quickly by mechanical pressure, either over the entire surface of the article, or over selected areas as may be desirable or necessary. To accomplish this result, a solidification die, hereinafter referred to as die 12, is provided as shown in FIG. 1. Die 12 is mounted on any suitable carrier, such as a U-shaped hollow mounting member 13 and is provided with perforations or holes through its surface which contacts the article, with a chamber 12a in the rear of this die, the purpose of which will be hereinafter explained.

The carrier 13 is mounted on a pair of links 14 (FIG. 1). The upper ends of these links are pivoted to the carrier by pins 14a, while their lower ends are pivoted to the ends of levers 15. The opposite ends of these levers 15 are fixed to a transverse shaft 16 pivotal in upstanding standards 17 at each side of the apparatus and rigid with the base of the machine. Lever 15 carries, intermediate its ends, a cam follower 18 projecting into a cam track 19 in a cam 20. The cam 20 is fixed on a shaft 21 connected by gearing to the shaft 4 and this gearing causes the shaft 21 to make one complete revolution for each passage or movement of the forming die past the solidification die. In other words, the cam shaft makes five complete revolutions for each revolution of the forming unit shaft 4 through appropriate gearing as described in the parent application.

Movement of the carrier 13 toward and away from the forming dies is accomplished by two toggles 22. To the elbow of each toggle is attached a link 23 carrying a cam follower 24, operable in a cam track 25 formed in a cam 26. The cams 26 of both links are fixed to the shaft 21 and one is positioned back to back with the cam 20. One terminal of each toggle is secured to a pivot rigid with the adjacent standard 17, while the other terminal of such toggle is secured by a pivot 27 to a hanging arm 28, supported at its upper end on a pivot 29 also carried by and rigid with the standard 17. The hanging arms 28 are provided therein with arcuate slots forming cam tracks 30 to receive roll trunnions 31 on the corresponding ends of the carrier 13. The structure described is duplicated at the opposite ends of the carrier 13.

With this arrangement, the carrier 13 is mounted to travel with the individual forming dies, with the solidification die 12 engaged therewith, and during an appreciable portion of the annular movement of such forming dies, to compress and solidify the pulp articles on said forming dies. The pivotal mounting of the carrier on the links 14 permits of tilting of the carrier 13 to retain parallelism between the die surfaces of the forming dies 9 and solidification dies 12, while the shaping of the slots 30 accurately controls such tilting movement, and the toggles apply the necessary force to the pressing carrier to effect the pressing operation.

The cam tracks of the cams 20 and 26 are so shaped that the solidification die 12 is engaged with the article on each forming die 9 shortly after it leaves the tank. While thus engaged with the article, it travels along therewith for a distance to compact and solidify said article and it is then withdrawn from the article and lowered, to be next engaged with the article on the next following die to repeat its cycle of operations with respect to this latter die.

To insure proper registration between the forming and solidification dies while coacting with one another, the carrier 13 of the latter die is provided at its opposite ends with spaced apart indexing rolls adapted to receive between them indexing fingers having fixed relation to and rotatable with the forming drum, as shown and described in the aforesaid parent application.

During the period of coaction between the solidification die 12 and the freshly formed articles on forming dies 9, it is possible, when certain pulp or fibre materials are used, to express a considerable amount of water from the article, eliminate air bubbles and voids between the fibres making up the article, and thereby render the finished product more serviceable. During such coactive relationship, and while pressure is being applied on the freshly formed article for a considerable period of time, vacuum is maintained through the forming dies to draw away and remove any water which may be expressed from the articles thereon during this solidification operation; also, vacuum is applied, according to this invention, through a pipe 32 located in a pocket in the bottom of the die carrier 13, as shown in FIG. 1, so that any water or air which may be freed from the articles during the solidification step may be removed from the articles and die by a combination of vacuum and gravity. A pocket in the bottom of the die carrier accumulates any sudden rush of water which may be expressed from the articles and permits it to be drawn off by pipe 32 without any danger of its being blown back through the perforations in the die 12 when the dies are separated.

To prevent any possibility of the articles being detached from the forming dies 9 when the solidification die 12 is withdrawn, compressed air may be introduced through the top of the die carrier 13 via pipe 32a for a brief instant to insure that no part of any article is retained on the surfaces of die 12 when said dies are withdrawn.

In addition to solidifying the articles on the forming dies, the solidification die, according to this invention, provides for different treatments of different areas or portions of the freshly formed article for special and useful purposes. The surface shape of the solidification die 12 conforms exactly to the shape of the solidified article on the corresponding die 9 where it is desired to solidify and densify the entire structure of the finished product. However, certain portions of such die 12 provide greater spacing or clearance between them and the die 9 over any areas of the article which it is desired to leave uncompressed or unsolidified or where it is desired to deliberately disrupt or rearrange the wet fibre structure for the purpose of providing cushioning or other types of areas or portions in the article being produced. This may be accomplished in the manner next described, reference being had to FIGS. 2–5 of the drawings.

FIG. 2 shows, considerably enlarged, a fragmental section of a forming die 9 with the customary openings 201 through the die face to the rear of the die through which suction or vacuum is applied, and a die covering 202 of fine mesh wire. Shown on this die in FIG. 2 is an accreted fibre deposit A of whatever thickness it may be desired or may be necessary for the production of a finished product article for any specific purpose.

A similarly enlarged section of the cooperating solidification die 12 is shown in FIG. 3. In this case, there is provided a pocket or a series of pockets or cavities 203, as may be desired, in the face of this die, through which there are communicating passages or openings 204.

The cooperation of the forming die 9 and the solidification die 12 is shown also in an enlarged section in FIG. 4. Here the vacuum or suction applied through opening 204 of the solidification die 12 is greater than the suction or vacuum through openings 201 of die 9. Therefore, it follows that the fibre deposit, still in a soft and pliable state, will be drawn away from the wire screen 202 covering the surface of die 9, into the recess or pocket 203 of the solidification die 12. When the solidification die is removed from its contact with the article on the forming die, the article will appear as illustrated in FIG. 5. The wet pliable fibres, which have been stretched out of their initial interfelted and interlocked condition by drawing them into the shape shown in FIG. 4, will not and do not return to their original interlocked state, but are left in a soft loose condition indicated at 205, FIG. 5. It is possible in this way to make many and varied modifications of the surface shape of the solidification die for accomplishing different purposes and providing different types and placement of surfaces, cushioned areas, etc., on the finished product.

The degree of softness or looseness of the portions 205 of the end product will, manifestly, depend upon the difference in suction applied through the openings 201 of the forming cylinder and through the openings 204 of the cavities and, by adjustment thereof, the portions 205 may be made to either partially fill the cavities as shown in FIG. 4 or completely fill the same, as the case may be. Even when no suction is applied through the openings 204 of the cavities or when the suctions applied through the openings 201 and 204 are the same, the end product will be compressed unequally over its surface, i.e., it will be completely solidified at certain areas but left in generally loose, formed condition at others.

It should be understood, however, that, when cushioned portions or areas are to be formed in an article, all those dies which contact with said article after it leaves the solidification and forming dies, should be so constituted that their areas which correspond to the cushioning areas of the article will maintain the latter areas, throughout the subsequent operations, such as disclosed in the parent application, to insure their presence in the end product.

After a formed article has been acted upon by the solidification die in the manner stated, it remains upon the forming die and travels along with it to be subsequently removed from the latter die by a transfer die. In the preferred form of this invention this transfer die further compresses those parts of the article which have been compressed by the solidification die, before removing the article from the forming die.

It will thus be understood that, according to this invention, the freshly formed pulp article, while it remains on the forming die 9, is acted upon by the solidification die 12, so that certain predetermined portions of the wall of that article are subjected to mechanical pressure between coacting pressure applying portions of said dies while other predetermined portions of the wall of said article are either left uncompressed or contemporaneously distended or expanded into the pockets 203 of the solidification die under the action of suction produced in said pockets while suction is maintained on the forming die. This novel procedure results in a new product forming part of this invention. After drying, it is adapted for many uses, among which may be mentioned packing flats and containers for the shipment of fragile articles and delicate apparatus and parts thereof which require protection against handling during shipment.

The foregoing detailed description sets forth the invention in its preferred practical form, but the invention is to be understood as fully commensurate with the appended claims.

This disclosure contained in my aforesaid copending application, Serial No. 382,985, now Patent No. 2,938,582, is incorporated in its entirety by reference into and as part of the disclosure of the present application.

Having thus fully described the invention, what I claim as new and desire to secure by Letters Patent is:

1. Method of making a pulp fibre article which comprises: suction forming an article on a forming die by applying suction through said die to the contacting side of the article being formed while the die is immersed in a liquid-pulp fibre mixture, and immediately thereafter solidifying certain portions of the freshly formed article on the forming die by mechanically expressing some of the liquid remaining in those portions of the article while contemporaneously distending and rearranging the fibres of the unsolidified portions of the article by the application of suction to the opposite side of said unsolidified portions of the article while maintaining the fibres of said latter portions free from compressive forces.

2. Method according to claim 1, wherein the fibres in the unsolidified portions are distended and rearranged while the solidified portions of the article are held against expansion between confining surfaces one of which is the surface of the forming die on which the article is supported.

3. Method according to claim 1, wherein the solidified portions of the article are produced by compressing said portions between members of a die couple one of which is the forming die on which the article is supported.

4. Method of making a pulp fibre article which comprises: forming an article of substantially uniform thickness on a forming die by applying suction to the die contacting face of the article as it is being formed and while the die is immersed in a liquid-pulp fibre mixture, thereafter removing the forming die with article thereon from the mixture and applying to said article a solidification die having an article contacting face certain portions of which are adapted to engage and compress corresponding portions of the article on the forming die, while other portions of said face are chambered to permit of expansion of the registering portions of the article, and applying suction through the chambered portions of the solidification die to distend and rearrange the fibres of said registering portions of the article while maintaining the fibres of said latter portions free from compressive forces.

5. Method according to claim 4, wherein the forming die and solidification die continuously travel while both of said dies are engaged with said article.

6. Method of making a pulp fibre article which comprises: forming an article on a suction forming die from a liquid-pulp fibre mixture, immediately thereafter solidifying a predetermined portion of the freshly formed article while it remains on the forming die by mechanically compressing said portion of the article, and contemporaneously distending and rearranging the fibres of another portion of the article by the simultaneous application of suction to the opposite sides of the latter portion of the article while maintaining the fibres of said latter portions free from compressive forces.

7. Method of making a pulp article which comprises: forming an article of substantially uniform thickness on a suction forming die by applying suction to the pulp contacting face of said die while the said die is rotated about a fixed axis through a pulp mixture, continuing rotation of the forming die about said axis to remove said die with the article thereon from the pulp mixture, and applying to said article, while on the forming die, a solidification die having an article contacting face certain portions of which are adapted to engage and compress corresponding portions of the article while other portions of said face are chambered to permit expansion of the registering portions of the article, moving said forming die along a curvilinear path coaxial with the axis of rotation of the forming die while both of said dies are in engagement with the article between them, and contemporaneously applying suction through both the forming die and the chambered portions of the solidification die to distend and rearrange the fibres of those portions of the article which register with the chambers of the solidification die while maintaining the fibres of said latter portions free from compressive forces.

8. An open-faced molded fibrous pulp article in a portion of the area of which the fibres are in tightly compressed relation to form at said portion a relatively hard, dense and compact wall structure, and in another portion of which area the fibres are in uncompressed, distended and dilated relation to form a relatively soft pliable cushion wall structure, of greater thickness than the wall structure portion which is relatively hard, dense and compact.

References Cited in the file of this patent
UNITED STATES PATENTS

| 701,734 | Jenks | June 3, 1902 |
| 1,707,430 | Chaplin | Apr. 2, 1929 |
| 1,903,655 | Perkins | Apr. 11, 1933 |
| 2,221,200 | Perry | Nov. 12, 1940 |
| 2,515,113 | Chaplin | July 4, 1950 |